United States Patent

Endo et al.

[11] Patent Number: 5,045,372
[45] Date of Patent: Sep. 3, 1991

[54] MAGNETIC RECORDING MEDIUM CONTAINING FERROMAGNETIC METAL POWDER AND A SPECIFIC FATTY ACID ESTER IN A CONTENT DEPENDENT UPON THE SPECIFIC SURFACE AREA OF THE FERROMAGNETIC METAL POWDER

[75] Inventors: Yasushi Endo; Mikihiko Kato; Yasuo Nagashima; Yasuyuki Yamada, all of Kanagawa, Japan

[73] Assignee: Fuji Photo Film Co., Ltd., Kanagawa, Japan

[21] Appl. No.: 466,809

[22] Filed: Jan. 18, 1990

[30] Foreign Application Priority Data

Jan. 19, 1989 [JP] Japan ................... 1-10299
Nov. 30, 1989 [JP] Japan ................... 1-311559

[51] Int. Cl.$^5$ .............................................. G11B 23/00
[52] U.S. Cl. ...................................... 428/64; 428/694; 428/900; 428/695; 428/402
[58] Field of Search .................. 428/900, 694, 64, 65, 428/695, 402

[56] References Cited

U.S. PATENT DOCUMENTS

| 4,652,500 | 3/1987 | Ejiri et al. | 428/695 |
| 4,675,250 | 6/1987 | Kanai et al. | 428/403 |
| 4,772,522 | 9/1988 | Kubota et al. | 428/328 |
| 4,786,551 | 11/1988 | Ootani et al. | 428/323 |

Primary Examiner—Merrell C. Cashion, Jr.
Assistant Examiner—Stevan A. Resan
Attorney, Agent, or Firm—Sughrue, Mion, Zion Macpeak & Seas

[57] ABSTRACT

A magnetic recording medium having on a non-magnetic support a magnetic layer mainly composed of a ferromagnetic metal powder and a binder resin is disclosed, wherein the specific surface area S (m$^2$/g) of the ferromagnetic metal powder is from 30 to 65 and the magnetic layer further contains a fatty acid ester in a content Y (% by weight) to the ferromagnetic metal powder of the range of $0.05S+5.5 \leq Y \leq -0.2S+24$ when the specific surface area S is from 30 to less than 50 and the range of $0.06S+4.7 \leq Y \leq -0.13S+21$ when the specific surface area S is from 50 to 65. The magnetic recording medium is suitable for high density recording and exhibits excellent running durability.

4 Claims, 1 Drawing Sheet

MAGNETIC RECORDING MEDIUM CONTAINING FERROMAGNETIC METAL POWDER AND A SPECIFIC FATTY ACID ESTER IN A CONTENT DEPENDENT UPON THE SPECIFIC SURFACE AREA OF THE FERROMAGNETIC METAL POWDER

FIELD OF THE INVENTION

This invention relates to a magnetic recording medium, and more particularly to a magnetic recording medium using a ferromagnetic metal (or alloy) powder having improved running durability, said magnetic recording medium being particularly suitable for a magnetic disk.

BACKGROUND OF THE INVENTION

Recently, with the propagation of personal computors, word processors, etc., magnetic disks have been required to have a higher recording density.

In particular, a magnetic recording medium having a magnetic recording layer mainly composed of a ferromagnetic metal powder and a binder (hereinafter referred to as a metal powder type magnetic recording medium) is excellent in magnetic characteristics such as coercive force (Hc), saturation magnetic flux density (Bm), etc., and, thus, has been expected to be used as a magnetic recording medium for high recording density. Also, the metal powder type magnetic recording medium has been practically used as a recording media for 8 mm video tapes and video floppy disks.

For further increasing the recording density of the metal powder type magnetic recording medium, various means for pulverizing a ferromagnetic metal powder, smoothing the magnetic recording layer, and uniformly dispersing a ferromagnetic metal powder in the magnetic recording layer have been applied.

In these means, the means of pulverizing a ferromagnetic metal powder is particularly effective and there is a tendency toward using a ferromagnetic metal powder having a large specific surface area.

However, when the ferromagnetic powder is pulverized in the aforesaid metal powder type magnetic recording medium, the surface of the magnetic layer thereof is very smooth, which results in increasing the friction coefficient of the magnetic layer and each part in a magnetic recording and reproducing apparatus during running of the magnetic recording medium.

Furthermore, in a magnetic disk, various troubles on the running durability, such as the occurrences of stick slip, sticking of the magnetic layer onto a magnetic head, etc., which have never occurred in the case of using conventional γ-iron oxide and Co-modified iron oxide, are caused.

Hitherto, various methods for improving the running durability of magnetic recording media have been proposed.

For example, there are proposed methods of adding abrasives into magnetic layers. That is, there are a method of adding α-type ferric oxide as disclosed in JP-A-58-159227 (the term "JP-A" as used herein means an "unexamined published Japanese patent application"), a method of adding $Al_2O_3$ as disclosed in JP-A-58-171721, a method of adding particles having a mean particle size of not more than 0.2 μm and a Mohs' hardness of at least 6 as disclosed in JP-A-61-289528, etc. However, when a sufficient amount of each abrasive for improving the running durability of the magnetic recording medium is added according to these methods, the abrasion of the magnetic head is accelerated and also the surface property of the magnetic layer is reduced to lower the electromagnetic characteristics thereof.

Also, a method of using an abrasive and a fatty acid ester (JP-A-58-189826) and a method of using carbon black and a silicone oil (JP-A-62-195730) are proposed.

Furthermore, as a method of adding a lubricant into a magnetic layer, there are a method of adding a polyethylene glycol ester (JP-A-57-3225), a method of adding a ketone compound (JP-A-57-158026), a method of adding a glycerol ester of a fatty acid and a sorbitan ester of a fatty acid (JP-A-57-158027), a method of adding a fatty acid and a fatty acid ester (JP-A-58-130435 and JP-A-60-5420), and a method of adding a fatty acid alkyl ester and an fatty acid alkoxy ester (JP-A61-229234 and JP-A-61-230624). However, in these methods, the control of the addition amount of the lubricant(s) is difficult and if the lubricant is added to an extent of obtaining the lubricating effect, the mechanical strength of the magnetic layer is weakened to reduce the running durability of the magnetic recording medium and further cause sticking of the layer onto a magnetic head.

Furthermore, although the problems about the running durability of a magnetic recording medium using a fine ferromagnetic metal powder may be solved to some extent by the aforesaid methods, the extent of the improvement by these methods is yet insufficient and also these methods are sometimes accompanied by the reduction of other characteristics of the magnetic recording media.

In particular, when the on-off of a magnetic head onto a magnetic layer is repeated many times as in the case of a floppy disk, the friction coefficient of the magnetic layer is increased during running thereof to cause the vibration of a magnetic head by stick slip thereof, thereby the output of the magnetic recording medium becomes unstable and also to cause sticking of the magnetic layer onto a magnetic head, thereby running of the magnetic recording medium becomes inferior. However, it is very difficult to solve these problems.

Moreover, when a ferromagnetic metal powder is used for a floppy disk as the ferromagnetic powder thereof, there is a problem that the magnetic layer is injured by rubbing against the liner of a jacket for the floppy disk, which is not so serious in the case of using a conventional iron oxide-series ferromagnetic powder. That is, the magnetic layer of a floppy disk is injured by rubbing against the liner composed of a nonwoven fabric during running of the floppy disk, thereby drop out is liable to occur during the use of the floppy disk. This problem is liable to become more severe with reduction of the particle sizes of the ferromagnetic metal powder. An effective means for solving the problems occurring in the floppy disk using a ferromagnetic metal powder has not yet been proposed.

SUMMARY OF THE INVENTION

The present invention has been made for solving the aforesaid problems in the conventional techniques and the object of this invention is to provide a metal powder type magnetic recording medium of high recording density having an excellent running durability.

It has now been discovered that the aforesaid object can be attained by the invention as set forth hereinbelow.

That is, according to this invention, there is provided a magnetic recording medium having on a non-magnetic support a magnetic layer mainly composed of a ferromagnetic metal powder and a binder resin, wherein the specific surface area S (m$^2$/g) of said ferromagnetic metal powder is from 30 to 65 and the magnetic layer further contains a fatty acid ester in a content Y(% by weight) to the aforesaid ferromagnetic metal powder of the range of $0.05S+5.5 \leq Y \leq -0.2S+24$ when the specific surface area S is from 30 to less than 50 and of the range of $0.06S+4.7 \leq Y \leq -0.13S+21$ when the specific surface area S is from 50 to 65.

DETAILED DESCRIPTION OF THE INVENTION

Figure 1:
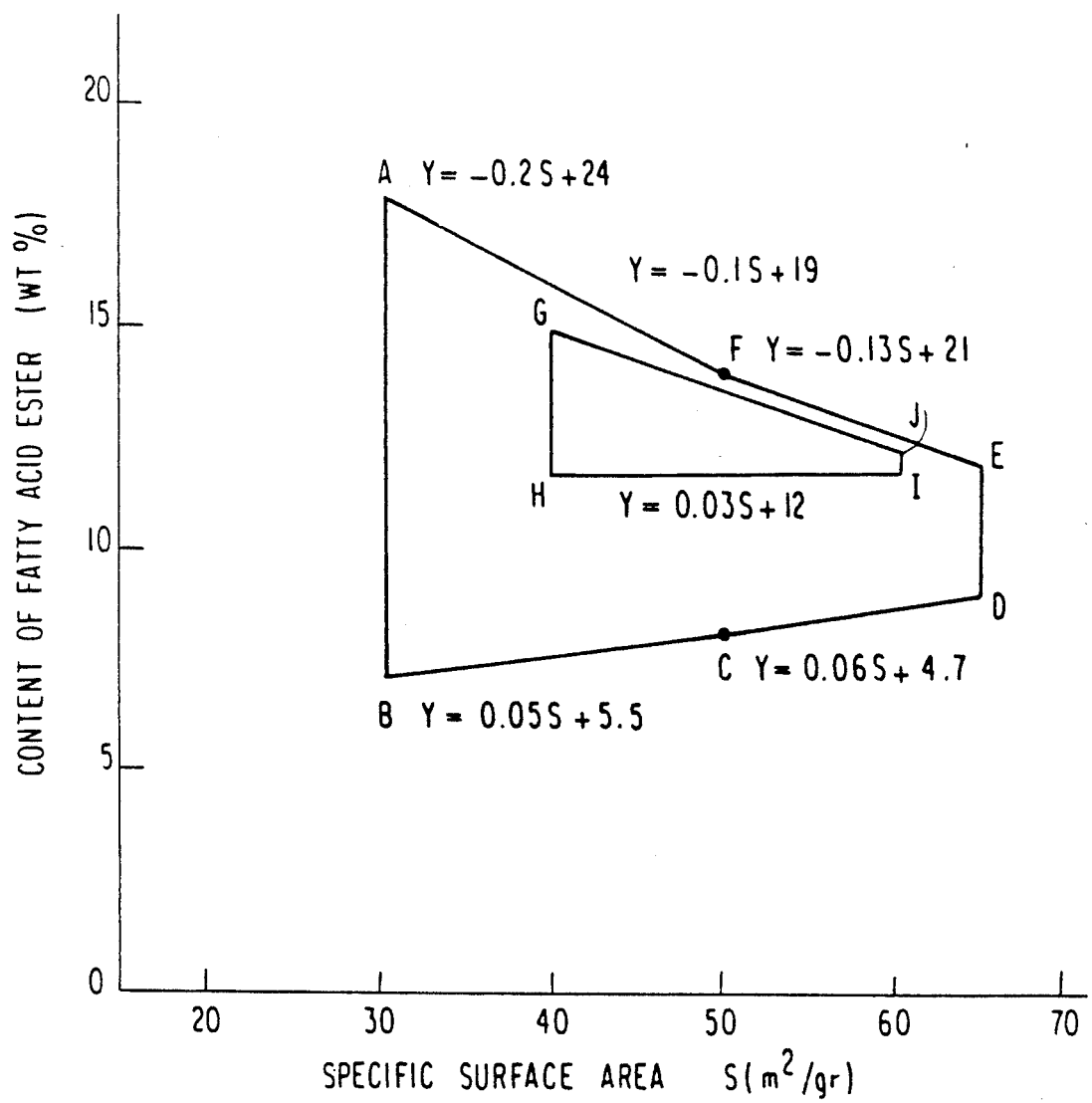
FIG. 1 is a graph showing the relation between the specific surface area S(m$^2$/g) of the ferromagnetic metal powder of the magnetic recording medium of this invention and the content Y(% by weight) of the fatty acid ester.

Then, the invention is described in detail.

In the magnetic recording medium of this invention, the specific surface area S (shown by the unit of m$^2$/g) of the ferromagnetic metal powder in the magnetic layer and the content Y (% by weight) of a fatty acid ester (hereafter referred to as lubricant) contained in the magnetic layer to the aforesaid ferromagnetic metal powder are in the specific relation shown in FIG. 1.

That is, in the range that the specific surface area S of the aforesaid ferromagnetic metal powder is from 30 to 65, the content Y of the aforesaid lubricant is selected from the range existing between the line A-F-E and the line B-C-D in FIG. 1.

In this invention, when the specific surface area S is from 30 to 50, the content Y is between $0.05S+5.5$ (the line B-C) and $-0.2S+24$ (the line A-F) and when the specific surface area S is from 50 to 65, the content Y is between $0.06S+4.7$ (the line C-D) and $-0.13S+21$ (the line F-E).

Furthermore, for effectively attaining the object of this invention, it is preferred that the specific surface area S of the aforesaid ferromagnetic metal powder is in the range of from 40 to 60 and the content Y of the lubricant is in the range of $0.03S+12 \leq Y \leq -0.1+S19$. That is, it is preferred that the specific surface area S of the ferromagnetic metal powder and the content Y of the lubricant are in the range surrounded the lines G-H, H-I, I-J, and J-G in FIG. 1.

In this invention, by controlling the amount of the lubricant in the magnetic layer according to the size of the ferromagnetic metal powder shown by the specific surface area as described above, the running durability of the magnetic recording medium can be improved.

As is clear from FIG. 1, in the magnetic recording medium of this invention, the range of the proper content of the lubricant in the magnetic layer becomes narrower as the specific surface area of the ferromagnetic metal powder is larger.

If the content of the lubricant in the magnetic layer is over the aforesaid range, the mechanical strength of the magnetic layer is weakened to reduce the running durability of the magnetic recording medium and also when the magnetic recording medium is run under a low temperature circumstance, excessive lubricant begins to deposit on the surface of the magnetic layer, thereby the friction coefficient of the magnetic layer ultimately increases and also the lubricant sticks to a magnetic head and is further deposited thereon to reduce the recording and reproducing characteristics.

On the contrary, if the content of the lubricant in the magnetic layer is less than the aforesaid range, a sufficient lubricating effect is not obtained although the quality of the magnetic layer is not reduced, and in particular, under a high temperature condition, it sometimes happens that the magnetic layer is scraped.

Furthermore, the running durability of the magnetic recording medium is considerably influenced by the specific surface area of the ferromagnetic metal powder in the magnetic layer thereof. That is, a ferromagnetic metal powder having a large specific surface area is used, voids in the magnetic layer become less, the lubricant is liable to deposit on the surface of the magnetic layer, and in particular, in a low temperature condition, the friction coefficient of the magnetic layer is increased and sticking of the lubricant onto a magnetic head occurs.

In the case of using a magnetic recording medium using a ferromagnetic metal powder in a floppy disk, with the decrease of the particle sizes of the ferromagnetic metal powder, that is, with the increase of the specific surface area of the ferromagnetic metal powder for increasing the recording density, there is a tendency that the magnetic layer is liable to be injured by the liner of a jacket for the floppy disk and in particular, when the specific surface area is over 40 m$^2$/g, the tendency becomes severe.

However, in the magnetic recording medium of this invention, the aforesaid problem can be reduced by selecting the content of the lubricant in the magnetic layer in accordance with the value of the specific surface area of the ferromagnetic metal powder contained in the magnetic layer. Also, by using the combination of the specific surface area of the aforesaid ferromagnetic metal powder and the content of the lubricant in the range surrounded by the lines G-H, H-I, I-J, and J-G in FIG. 1, a floppy disk having excellent electromagnetic characteristics without causing injury of the magnetic layer by a jacket liner specific to the case of using a ferromagnetic metal powder, that is, having an excellent running durability can be obtained.

As described above, the present invention has been made on considering that the running durability of a magnetic recording medium is greatly influenced by both the particle size (specific surface area) of a ferromagnetic metal powder in the magnetic layer and the content of the lubricant in the layer, and as the result of confirming that for improving the running durability of the magnetic disk, the specific surface area S of the ferromagnetic metal powder and the content of the lubricant in the magnetic layer should be in the specific relationship, the invention has been accomplished.

The ferromagnetic metal powder which is used for the magnetic recording medium of this invention is required to contain at least Fe, preferably in an amount of 80 atomic % or more, and is practically a ferromagnetic powder of a metal or an alloy mainly composed of Fe, Fe-Co, Fe-Ni, Fe-Co-Ni, etc. For improving the characteristics of the metal powder or the alloy powder, a nonmetal such as B, C, Al, Si, P, etc., is, sometimes, added thereto. Usually, an oxide layer is formed on the surface of the ferromagnetic metal powder for stabilizing the powder.

The particle sizes of the ferromagnetic metal powder for use in this invention is such that the surface area is from 30 to 65 m$^2$/g, and preferably from 40 to 60 m$^2$/g as specific surface area.

If the particle size is such that the surface area is less than 30 m$^2$/g, the recording density cannot be desirably increased, while if the particle size is such that the surface area is over 65 m$^2$/g, the saturation magnetization amount is reduced and also the dispersibility of the ferromagnetic metal powder is reduced.

Also, it is preferred that the crystalline size of the ferromagnetic metal powder is less than 400 Å and further it is preferred that the axial ratio is at least 5, the saturation magnetization is at least 110 emu/g, and the coercive force is at least 800 Oe.

The ferromagnetic metal powder of this invention can be prepared by reducing needle-like iron oxyhydroxide particles which may contain other metals, or needle-like iron oxide particles obtained from those iron oxyhydroxide particles in a conventional manner as described in U.S. Pat. No. 3,607,219 and 3,702,270.

The ferromagnetic metal powder is generally contained in an amount of at least 40% by weight, preferably at least 50% by weight, based on the weight of the magnetic layer.

As a lubricant being contained in the magnetic recording medium of this invention, fatty acid esters are used. In these esters, the fatty acid esters obtained from monobasic fatty acids having from 1 to 24 carbon atoms and monohydric to hexahydric alcohols having from 3 to 32 carbon atoms or the fatty acids having from 11 to 28 total carbon atoms obtained from monobasic fatty acids having 10 or more carbon atoms and monohydric to hexahydric alcohols are preferred. Also the fatty acid esters having a branched structure in the molecule are particularly preferred.

Then, the fatty acid esters which are used for the magnetic recording media of this invention are practically described below.

That is, fatty acid esters having a branch in an alcohol residue, such as the fatty acid ester composed of a branched alcohol, which is usually called as a Guerbet alcohol from the synthesis method thereof, shown by following formula (I), wherein an alkyl group is branched at the 2-position of the alcohol residue;

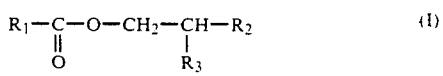

(I)

wherein R$_1$ represents a straight chain or branched alkyl or alkenyl group having from 15 to 29 carbon atoms and preferably from 15 to 17 carbon atoms and R$_2$ and R$_3$ each represents an alkyl group and the sum of the carbon atoms of R$_2$ and the carbon atoms of R$_3$ is from 14 to 20 or a fatty acid ester having a methyl branch in the alcohol residue shown by following formula (II)

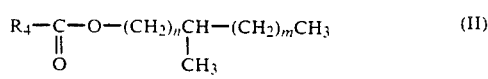

(II)

wherein R$_4$ represents a straight chain or branched alkyl or alkenyl group having from 7 to 29 carbon atoms and preferably from 15 to 17 carbon atoms and n and m each represents an integer, n being an integer of 2 or more and the sum of n and m being from 7 to 33 and preferably from 10 to 20, can improve the running durability of the magnetic recording medium in a wide temperature range and hence are very effective for attaining the object of this invention.

Specific examples of these fatty acid esters are stearyl laurate, isocetyl palmitate, oleyl palmitate, isotridecyl stearate, isocetyl stearate, isocetyl isostearate, oleyl oleate, oleyl stearate, oleyl isostearate, isostearyl stearate, stearyl isostearate, isostearyl isostearate, eicosenyl isostearate, eicosenyl stearate, isotetracosyl stearate, isotetracosyl behenate, oleic acid diglyceride, etc.

Among them, isotridecyl stearate, isocetyl stearate and isostearyl stearate are most preferred.

As the binder for use in this invention, there are conventionally known thermoplastic resins, thermosetting resins, reactive resins, and mixtures of these resins. Specific examples of the binder resin are vinyl chloride-vinyl acetate series copolymers, vinyl chloride series copolymers, acrylic acid ester series copolymers, methacrylic acid ester series copolymers, urethane elastomers, cellulose derivatives, and epoxypolyamide resins. For these binders, various kinds of polyisocyanates may be used as a hardening agent.

The amount of the binder is preferably from 5 to 300 parts by weight per 100 parts by weight of the ferromagnetic metal powder.

Also, for improving the dispersibility of the ferromagnetic metal powder in the binder resin, it is preferred to introduce a proper amount of a functional group such as a carboxy group, a sulfon group, a hydroxy group, an amino group, an epoxy group, etc., into the molecule of the binder resin.

As the non-magnetic support for use in this invention, there are films of various synthetic resins such as polyethylene terephthalate, polycarbonate, polyamide, polymide, etc., and metal foils such as an aluminum foil, a stainless steel foil, etc.

The magnetic layer of the magnetic recording medium such as a magnetic disk of this invention usually contains carbon black and an abrasive together with the aforesaid ferromagnetic metal powder, the lubricant, and the binder resin and also, as the case may be, contains an antistatic agent, a dispersing agent, etc.

As carbon black for use in this invention, there are furnace black for rubber, thermal black for rubber, black for color, acetylene black, etc. Specific examples (abbreviated names in the U.S.A.) are SAF, ISAF, T, HAF, SPF, FF, FEF, HMF, GPF, APF, SRF, MPF, ECF, SCF, CF, ET, MT, HCC, HCF, MCF, LFF, RCF, etc. These carbon blacks for use in this invention are classified by ASTM D-1765-82a in the U.S.A.

The mean grain size of the carbon black for use in this invention is from 5 to 1,000 m$\mu$ (electron microscope), the specific surface area thereof by a nitrogen adsorption method is from 1 to 1,000 m$^2$/g, the pH thereof is from 4 to 11 (JIS K-6221 1982 method), and the adsorption amount of dibutyl phthalate is from 10 to 800 ml/100 g (by JIS K-6221-1982 method).

In this invention, carbon black having a mean grain size of from 5 to 100 m$\mu$ is preferably used for the purpose of reducing the surface electric resistance of the coated layer and carbon black having a mean grain size of from 50 to 1,000 m$\mu$ is used for the purpose of controlling the strength of the coated layer. Also, for the purpose of controlling the surface roughness of the coated layer to reduce the spacing loss, carbon black of fine grain sizes (less than 100 m$\mu$) is used for smoothing the surface. For reducing the friction coefficient by roughening the surface, carbon black of coarse grains (larger than 50 mμ) is used.

As the abrasives being used for the magnetic recording media of this invention, materials having an abrasive action or a polishing action, which are generally used for magnetic recording media, such as α-alumina, molten alumina, silicon carbide, chromium oxide, cerium oxide, corundum, artificial diamond, α-iron oxide, garnet, emery (main components: Corundum and manetite), silica, silicon nitride, boron nitride, molybdenum carbide, boron carbide, tungsten carbide, titanium carbide, tripoli, diatomaceous earth, dolomite, etc., each having mainly a Mohs' hardness of at least 6 are used singly or as a combination of 4 or less kinds thereof.

The mean grain size of the abrasives is from 0.005 to 5 μm, and is preferably from 0.05 to 2 μm. The abrasive is added to the magnetic layer in an amount of from 1 to 20 parts by weight per 100 parts by weight of the ferromagnetic metal powder.

As the dispersing agent for use in this invention, there are fatty acids having from 10 to 22 carbon atoms ($R_5COOH$; $R_5$ is an alkyl group having from 9 to 21 carbon atoms), such as caprylic acid, capric acid, lauric acid, myristic acid, palmitic acid, stearic acid, oleic acid, elaidic acid, linolic acid, linolenic acid, stearolic acid, etc.; alkali metal (Li, Na, K, etc.) salts or alkaline earth metal (Mg, Ca, Ba, etc.) salts of the aforesaid fatty acids; metal soaps containing Cu, Pb, etc.; and lecithin.

Furthermore, higher alcohols having 4 or more carbon atoms (e.g., butanol, octyl alcohol, myristyl alcohol, and stearyl alcohol) and the sulfuric acid esters or phosphoric acid esters of these alcohols can also be used as a dispersing agent in this invention.

The dispersing agent is used for the magnetic layer in an amount of from 0.1 to 10 parts by weight per 100 parts by weight of the ferromagnetic metal powder. At use, the dispersing agent may be previously applied on the surface of the ferromagnetic metal powder or a non-magnetic fine powder, or may be added to a coating composition during the dispersion thereof.

As the antistatic agent for use in this invention, there are conductive powders such as graphite, carbon black, carbon black graft polymer, etc.; natural surface active agents such as saponin, etc.; nonionic surface active agents such as alkylene oxide series surface active agents, glycerol series surface active agents, glycidol series surface active agents, polyhydric alcohols, polyhydric alcohol esters, alkyl phenol ethylene oxide addition products, etc.; cationic surface active agents such as higher alkylamines, cyclic amines, hydantoin derivatives, amideamines, ester amides, quaternary ammonium salts, heterocyclic compounds (such as pyridine, etc.), phosphoniums, sulfoniums, etc.; anionic surface active agents having an acid group such as a carboxylic acid group, a sulfonic acid group, a phosphoric acid group, a sulfuric acid ester group, a phosphoric acid ester group, etc.; and amorphous surface active agents such as amino acids, amino sulfonic acids, sulfuric acid or phosphoric acid esters of aminoalcohols, alkylbetaine type surface active agents, etc.

At the production of the magnetic recording medium of this invention, the aforesaid various materials are mixed with an organic solvent followed by sufficiently kneading to provide a magnetic coating composition and the coating composition is coated on the aforesaid non-magnetic support, oriented, dried, and subjected to a surface smoothing treatment to provide the metal powder type magnetic recording medium.

Also, if necessary, a back layer may be formed on the support at the opposite side to the magnetic layer-carrying side.

As the aforesaid organic solvent, methyl ethyl ketone, cyclohexanone, isobutyl alcohol, butyl acetate, toluene, etc., can be used singly or as a mixture of them.

Also, at the preparation of the magnetic coating composition, the aforesaid materials are added simultaneously or successively to a kneader followed by kneading.

The thickness of the magnetic layer is usually from 0.2 to 8 μm.

Then, the present invention is practically described by the following examples. In addition, "parts" in the examples are by weight.

| EXAMPLE 1 | |
|---|---|
| Ferromagnetic metal powder (Fe 99 atomic %, Ni 1 atomic %, specific surface area 30 m²/g, coercive force 1580 Oe, σs 138 emu/g) | 100 parts |
| Vinyl chloride/vinyl acetate/ maleic anhydride copolymer (400 × 110A, trade name, made by Nippon Zeon Co., Ltd.) | 15 parts |
| $Cr_2O_3$ (mean grain size 0.5 μm) | 10 parts |
| Carbon black (Kettchen Black E.C., mean grain size 30 mμ) | 10 parts |
| Toluene | 36 parts |
| Methyl ethyl ketone | 36 parts |

After kneading the aforesaid components for about one hour, the following components were further added to the mixture.

| | |
|---|---|
| Polyester series polyurethane (UR 8300, trade name, made by Toyobo Co., Ltd., containing 150 eq./10 g of sulfonic acid group, weight mean molecular weight 70,000) | 10 parts |
| Methyl ethyl ketone | 250 parts |
| Toluene | 250 parts |

Then, the resultant mixture was dispersed for about 2 hours by a sand grinder (2,000 r.p.m.) to provide a uniform dispersion.

Furthermore, the following components were added to the dispersion followed by uniformly mixing to provide a magnetic coating composition.

| | |
|---|---|
| Isotridecyl stearate | 11 parts |
| Polyisocyanate (Coronate L, trade name, made by Nippon Polyurethane Co., Ltd.) | 10 parts |

The magnetic coating composition was coated on both surfaces of a polyethylene terephthalate film of 30 cm in width and 75 μm in thickness at a dry thickness of 3.0 μm each using a gravure role, dried at about 100° C., and a calender treatment was applied at about 40° C. to provide a metal powder type magnetic recording medium.

EXAMPLE 2

By following the same procedure as Example 1 except that the amount of isotridecyl stearate was changed to 7 parts, a metal powder type magnetic recording medium was obtained.

EXAMPLE 3

By following the same procedure as Example 1 except that the amount of isotridecyl stearate was changed to 18 parts, a metal powder type magnetic recording medium was obtained.

EXAMPLE 4

By following the same procedure as Example 1 except that 100 parts of a ferromagnetic metal powder containing 99 atomic % of Fe and 1 atomic % of Ni and having a specific surface area of 50 m$^2$/g, a coercive force of 1600 Oe, and $\sigma$s of 130 emu/g was used in place of the ferromagnetic metal powder in the example, a metal powder type magnetic recording medium was obtained.

EXAMPLE 5

By following the same procedure as Example 4 except that the amount of isotridecyl stearate was changed to 8 parts, a metal powder type magnetic recording medium was obtained.

EXAMPLE 6

By following the same procedure as Example 4 except that the amount of isotridecyl stearate was changed to 14 parts, a metal powder type magnetic recording medium was obtained.

EXAMPLE 7

By following the same procedure as Example 1 except that 100 parts of a ferromagnetic metal powder containing 99 atomic % of Fe and 1 atomic % of Ni and having a specific surface area of 65 m$^2$/g, a coercive force of 1600 Oe, and $\sigma$s of 122 emu/g was used in place of the ferromagnetic metal powder in the example, a metal powder type magnetic recording medium was obtained.

EXAMPLE 8

By following the same procedure as Example 7 except that the amount of isotridecyl stearate was changed to 9 parts, a metal powder type magnetic recording medium was obtained.

EXAMPLE 9

By following the same procedure as Example 7 except that the amount of isotridecyl stearate was changed to 12 parts, a metal powder type magnetic recording medium was obtained.

EXAMPLE 10

By following the same procedure as Example 1 except that 100 parts of a ferromagnetic metal powder containing 99 atomic % of Fe and 1 atomic % of Ni and having a specific surface area of 40 m$^2$/g, a coercive force of 1570 Oe, and $\sigma$s of 136 emu/g was used in place of the ferromagnetic metal powder in the example and the amount of isotridecyl stearate was changed to 12.5 parts, a metal powder type magnetic recording medium was obtained.

EXAMPLE 11

By following the same procedure as Example 10 except that the amount of isotridecyl stearate was changed to 15 parts, a metal powder type magnetic recording medium was obtained.

EXAMPLE 12

By following the same procedure as Example 1 except that 100 parts of a ferromagnetic metal powder containing 99 atomic % of Fe and 1 atomic % of Ni and having a specific surface area of 60 m$^2$/g, a coercive force of 1600 Oe, and $\sigma$s of 127 emu/g was used in place of the ferromagnetic metal powder in the example and the amount of isotridecyl stearate was changed to 13 parts, a metal powder type magnetic recording medium was obtained.

COMPARISON EXAMPLE 1

By following the same procedure as Example 1 except that the amount of isotridecyl stearate was changed to 5 parts, a metal powder type magnetic recording medium was obtained.

COMPARISON EXAMPLE 2

By following the same procedure as Example 1 except that the amount of isotridecyl stearate was changed to 19 parts, a metal powder type magnetic recording medium was obtained.

COMPARISON EXAMPLE 3

By following the same procedure as Example 4 except that the amount of isotridecyl stearate was changed to 6 parts, a metal powder type magnetic recording medium was obtained.

COMPARISON EXAMPLE 4

By following the same procedure as Example 4 except that the amount of isotridecyl stearate was changed to 16 parts, a metal powder type magnetic recording medium was obtained.

COMPARISON EXAMPLE 5

By following the same procedure as Example 7 except that the amount of isotridecyl stearate was changed to 7 parts, a metal powder type magnetic recording medium was obtained.

COMPARISON EXAMPLE 6

By following the same procedure as Example 7 except that the amount of isotridecyl stearate was changed to 14 parts, a metal powder type magnetic recording medium was obtained.

COMPARISON EXAMPLE 7

By following the same procedure as Example 4 except that oleic acid was used as a lubricant in place of tridecyl stearate, a metal powder type magnetic recording medium was obtained.

COMPARISON EXAMPLE 8

By following the same procedure as Example 1 except that 100 parts of a ferromagnetic metal powder containing 99 atomic % of Fe and 1 atomic % of Ni and having a specific surface area of 28 m$^2$/g, a coercive force of 1580 Oe, and $\sigma$s of 140 emu/g was used in place of the ferromagnetic metal powder in the example, a metal powder type magnetic recording medium was obtained.

COMPARISON EXAMPLE 9

By following the same procedure as Example 1 except that 100 parts of a ferromagnetic metal powder containing 99 atomic % of Fe and 1 atomic % of Ni and having a specific surface area of 68 m²/g, a coercive force of 1600 Oe, and σs of 115 emu/g was used in place of the ferromagnetic metal powder in the example, a metal powder type magnetic recording medium was obtained.

Each of the metal powder type magnetic recording media obtained in Examples 1 to 12 and Comparison Examples 1 to 9 as described above was cut into a sample in the form of a 3.5 inch floppy disk.

Then, each sample was mounted on a floppy disk drive FD-1137-D (made by NEC Corporation) and the thermocycle test was carried out for 24 hours from the circumstance of a temperature of 5° C. and a relative humidity of 10% to the circumstance of a temperature of 50° C. to a relative humidity of 30% in the following manner.

In the running state of maximum 25,000,000 times as pass number of running under the aforesaid conditions, the running durability of each sample was evaluated.

Also, the output of all the trucks was measured at the each 50,000th pass and the case that the output became less than 45% of the initial value was evaluated as the generation of drop out.

Furthermore, the electromagnetic characteristics of each sample were evaluated by measuring the value of the initial 2F reproduction output with the output of the sample of Example 1 being defined as 100%.

Also, the resolving power of each sample was evaluated by measuring it using a floppy disk drive FD-1137-D (made by NEC Corporation) with the resolving power of the sample in Example 1 being defined as 100%.

Furthermore, the friction coefficient (μ value) of a magnetic head at 5° C. was measured using a floppy disk drive FD-1137-D (made by NEC Corporation) under the conditions of a head load of 20 g, a rotation number of 360 r.p.m., and a truck 00.

The results obtained are shown in Table 1 below.

TABLE 1

| Sample | Running Durability (× 10,000 passes) | μValue | Reproduction Output (%) | Resolving Power (%) | Running Times before Occurrence of Drop out (× 10,000 passes) |
|---|---|---|---|---|---|
| Example 1 | >2500 | 0.18 | 100 | 100 | 2200 |
| Example 2 | >2500 | 0.15 | 101 | 100 | 2000 |
| Example 3 | >2500 | 0.25 | 99 | 100 | 2400 |
| Example 4 | >2500 | 0.20 | 99 | 100 | 2200 |
| Example 5 | >2500 | 0.18 | 100 | 100 | 2000 |
| Example 6 | >2500 | 0.25 | 99 | 100 | 2400 |
| Example 7 | >2500 | 0.22 | 99 | 102 | 2200 |
| Example 8 | >2500 | 0.20 | 99 | 101 | 2000 |
| Example 9 | >2500 | 0.24 | 99 | 102 | 2400 |
| Example 10 | >2500 | 0.22 | 100 | 99 | >2500 |
| Example 11 | >2500 | 0.24 | 100 | 100 | >2500 |
| Example 12 | >2500 | 0.23 | 99 | 100 | >2500 |
| Comparison Example 1 | 500*1 | 0.12 | 100 | 100 | 300 |
| Comparison Example 2 | 300*2 | 0.30 | 100 | 99 | 300 |
| Comparison Example 3 | 700*1 | 0.14 | 100 | 100 | 500 |
| Comparison Example 4 | 700*3 | 0.32 | 99 | 101 | 600 |
| Comparison Example 5 | 600*1 | 0.15 | 100 | 101 | 500 |
| Comparison Example 6 | 500*2 | 0.35 | 99 | 102 | 500 |
| Comparison Example 7 | 250*1 | 0.19 | 100 | 100 | 150 |
| Comparison Example 8 | >2500 | 0.17 | 101 | 94 | 2200 |
| Comparison Example 9 | >2500 | 0.23 | 93 | 100 | 2100 |

*1: The magnetic layer was scraped.
*2: Running was stopped due to sticking of the magnetic layer to the head.
*3: Running was stopped due to vibration of the head.

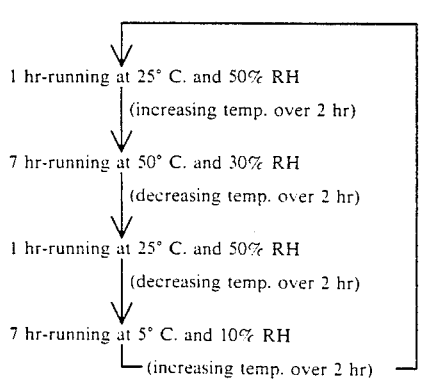

1 hr-running at 25° C. and 50% RH
   (increasing temp. over 2 hr)
7 hr-running at 50° C. and 30% RH
   (decreasing temp. over 2 hr)
1 hr-running at 25° C. and 50% RH
   (decreasing temp. over 2 hr)
7 hr-running at 5° C. and 10% RH
   (increasing temp. over 2 hr)

As is clear from the results shown in the above table, the samples of the magnetic recording media obtained in Examples 1 to 12 having the specific surface area of the ferromagnetic metal powder and the content of the fatty acid ester in the range surrounded by the lines A-B-C-D-E-F-A are excellent in running durability and also are in sufficient levels in the reproduction output and the resolving power. In particular, the samples in Examples 10, 11, and 12 give no generation of drop out by sliding with the liner of a jacket even when the samples run through 25,000,000 passes.

On the other hand, in the samples obtained in Comparison Examples 1, 3, 5 and 7, the magnetic layer of each sample was scraped during the running test since the amount of the fatty acid ester was deficient or the fatty acid ester was not used.

Also, in the samples obtained in Comparison Examples 2, 4, and 6, the magnetic layer stuck to the magnetic head during running or the friction coefficient increased by the excessive amount of the fatty acid ester to cause running trouble. Also, drop out occurred due to sliding of each sample with the liner of the jacket.

Furthermore, the samples obtained in Comparison Examples 8 and 9 did not show satisfactory value in the electromagnetic characteristics.

While the invention has been described in detail and with reference to specific embodiments thereof, it will be apparent to one skilled in the art that various changes and modifications can be made therein without departing from the spirit and scope thereof.

What is claimed is:

1. A magnetic recording medium having on a nonmagnetic support a magnetic layer consisting essentially of a ferromagnetic metal powder and a binder resin, wherein the specific surface area S (m$^2$/g) of the ferromagnetic metal powder is from 30 to 65 and the magnetic layer further contains a fatty acid ester in a content Y (% by weight) to the ferromagnetic metal powder of the range of $0.05S+5.5 \leq Y \leq -0.25 +24$ when the specific surface area S is from 30 to less than 50 and the range of $0.06S+4.7 \leq Y \leq -0.13S+21$ when the specific surface area S is from 50 to 65, and wherein the fatty acid ester selected from the group consisting of fatty acid esters represented by formula (I) and (II):

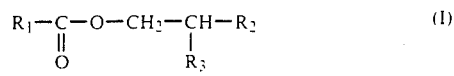

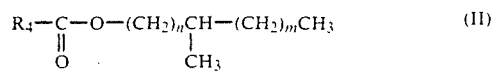

wherein $R_1$ represents a straight chain or branched alkyl or alkenyl group having from 15 to 29 carbon atoms; $R_2$ and $R_3$ each represents an alkyl group and the sum of the carbon atoms of $R_2$ and the carbon atoms of $R_3$ is from 14 to 20; $R_4$ represents a straight chain or branched alkyl or alkenyl group having from 7 to 29 carbon atoms; and n and m each represent an integer, n being an integer of 2 or more and the sum of n and m being from 7 to 33.

2. The magnetic recording medium as in claim 1, wherein the magnetic recording medium is a magnetic disk.

3. A magnetic recording medium as in claim 1, wherein the specific surface area S (m$^2$/g) of the ferromagnetic metal powder is from 40 to 60 and the magnetic layer contains a fatty acid ester in a content Y (% by weight) to the ferromagnetic metal powder of the range of $0.03S+12 \leq Y \leq -0.1S+19$.

4. The magnetic recording medium as in claim 3, wherein the magnetic recording medium is a magnetic disk.

* * * * *

UNITED STATES PATENT AND TRADEMARK OFFICE
CERTIFICATE OF CORRECTION

PATENT NO. : 5,045,372

DATED : September 3, 1991

INVENTOR(S) : Yasushi Endo, Mikihiko Kato, Yasuo Nagashima, Yasuyuki Yamada

It is certified that error appears in the above-identified patent and that said Letters Patent is hereby corrected as shown below:

COLUMN 13:
Claim 1, line 8, delete "-0.25 + 24" and insert -- -0.2S + 24 --.

Signed and Sealed this

Fourth Day of May, 1993

Attest:

MICHAEL K. KIRK

*Attesting Officer*  *Acting Commissioner of Patents and Trademarks*